Aug. 11, 1942.  G. W. TAYLOR ET AL  2,292,673
WATER VALVE
Original Filed Sept. 10, 1935
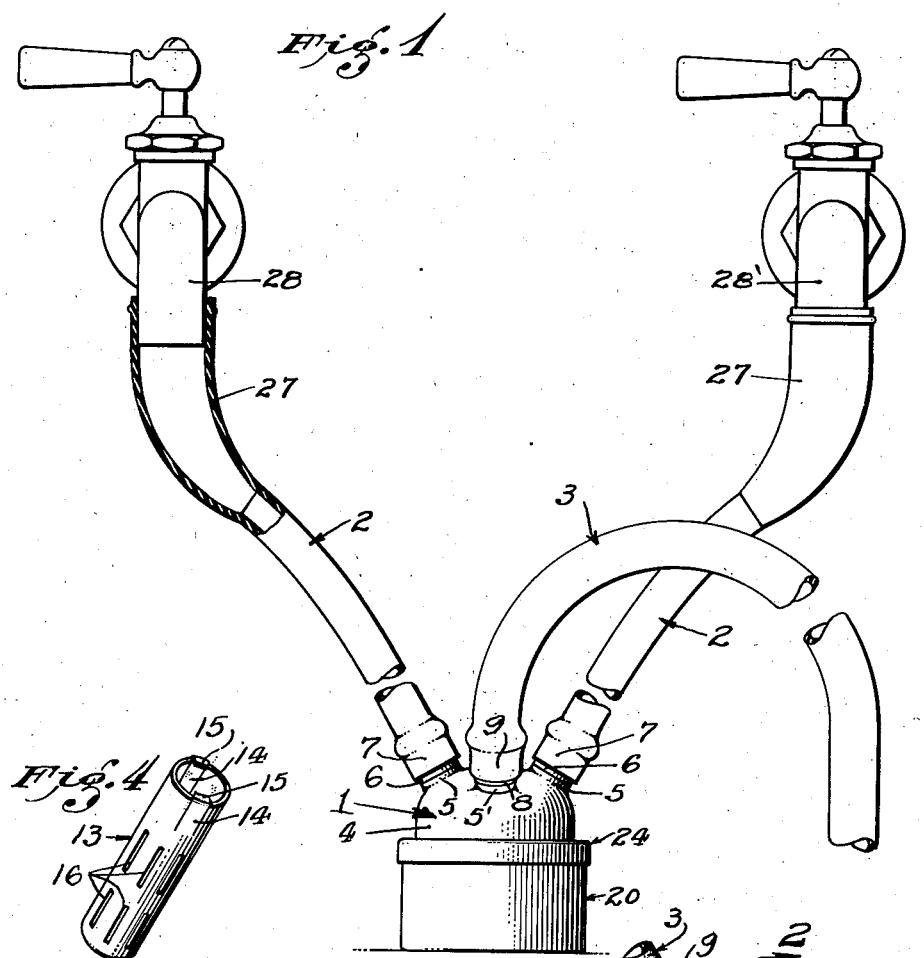
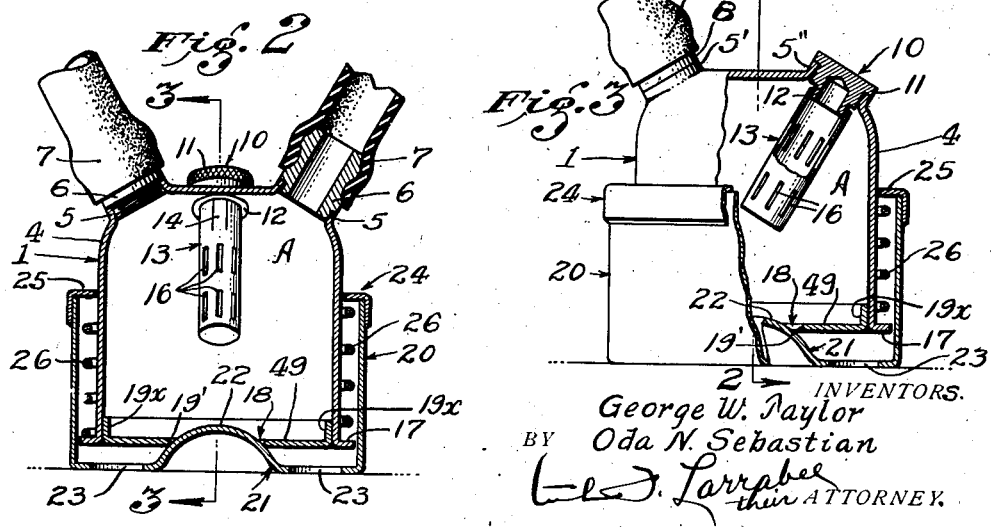
INVENTORS.
George W. Taylor
BY Oda N. Sebastian
Larrabee
their ATTORNEY.

Patented Aug. 11, 1942

2,292,673

UNITED STATES PATENT OFFICE 2,292,673

WATER VALVE

George W. Taylor and Oda N. Sebastian,
Los Angeles, Calif.

Substituted for abandoned application Serial No.
39,899, September 10, 1935. This application
January 12, 1940, Serial No. 313,608

3 Claims. (Cl. 128—229)

Our invention relates to water valves adapted for use among other things with syringes and among the objects of our invention are to provide a novel water valve which is adapted to be attached to a hot water and a cold water faucet whereby water may be delivered directly from such faucets to an adapter such as a syringe head or applicator.

Another object is to provide a novel water valve of this type which incorporates a novel pressure regulating means whereby the pressure at the discharge end or applicator never exceeds a predetermined value; thereby insuring against excessive pressures regardless of the pressures present in the water supply lines.

A further object is to provide a novel mixing chamber wherein hot and cold water may be thoroughly mixed so as to insure a uniform temperature at the applicator end.

A further object is to provide a novel water valve having a mixing chamber in which is incorporated a novel means for holding a medicament element or cartridge so positioned that the medicament contained therein may dissolve or mix with the water in the mixing chamber upon use of the apparatus.

A further object is to provide a novel water valve which may be connected to two separated faucets, or to a common outlet from a double faucet connection with hot and cold water supply, in which case the mixing chamber serves particularly to mix the medicament with the incoming water and to further mix the water to insure a uniform temperature at the applicator end.

A further object is to provide a novel water valve of this character which is particularly easy to clean or sterilize.

A still further object is to provide a novel water valve which may be connected with a wide variety of plumbing service outlets without alteration of its construction.

A still further object is to provide a novel water valve that is provided with a mixing chamber which may be easily and quickly emptied of all water or liquid therein when the valve is not in use, thereby ensuring that liquid will not be split when the device is detached from the liquid supply.

This application is a substitute application for our application Serial No. 39,899 filed September 10, 1935.

Other objects, advantages and features of the invention may appear from the accompanying drawing, the subjoined detail description and the appended claims.

The accompanying drawing illustrates the invention in the form we at present deem preferable.

Figure 1 is a front elevational view of our novel water valve shown connected to a pair of faucets with one of the connections thereto shown in section, the various tubes and conduits being shown fragmentary, and omitting the applicator end.

Fig. 2 is an enlarged sectional view of the water valve taken through line 2—2 of Fig. 3 with the hot and cold water supply tubes shown fragmentary and one end thereof in elevation, and showing the pressure relief valve closed.

Fig. 3 is a partially sectional view thereof taken through line 3—3 of Fig. 2 showing the pressure relief valve open.

Fig. 4 is a perspective view of the medicament receiving means.

Our water valve comprises a mixing chamber structure 1, having a mixing chamber A to which are attached hot and cold water supply tubes 2 and an applicator delivery or discharge tube 3.

The mixing chamber structure comprises a shell 4 having cylindrical side walls, and closed at its upper end except for four diverging internally threaded hollow bosses 5 which form a manifold head. Two of the bosses are disposed diametrically and receive nipple or coupling elements 6 designed to fit within the ends of the hot and cold water supply tubes 2, these tubes being formed of rubber, or the like, and are stretched over the nipples to form a water tight fit as indicated by 7.

A third boss 5' receives a nipple or coupling element 8 which is formed similarly to the nipples 6 and similarly receives the end portion 9 of the applicator delivery tube 3.

The fourth boss 5" receives a plug 10 having a knurled outer end 11. At its inner end the plug 10 is provided with a short stem terminating in a flange 12. The flange is adapted to receive one end of a medicament cartridge holder or retainer 13. Said holder 13 is cylindrical in form closed at one end and open at the other or attached end. At said attached end portion the holder is slit longitudinally to form catch fingers or tongues 14 having inturned ends or lips 15. The catch fingers 14 are adapted to spring over the flange 12 and lock behing the same so as to support the medicament holder in substantially axial alinement therewith as shown best in Fig. 3. The side walls of the holder 13 are provided with a plurality of openings or slits 16 or other suitable perforations for exposing any medicament the holder might contain to the interior of the mixing shell 4 when the plug is screwed into position as shown in Fig. 3.

The mixing shell is pressed, spun or otherwise formed from sheet or other metal, such as stainless steel, and is provided at its lower end with an external or outwardly extending flange 17. Also at its lower end the shell receives a valve element 18 in the form of a flat plate 49 with axially directed marginal portions 19x which are pressed, soldered or otherwise secured within the shell 4. The valve element 18 is provided with a centered aperture or port or valve seat 19'.

Surrounding the lower or cylindrical portion of the shell 4 in spaced relation thereto is a sleeve 20. The sleeve 20 is provided at its lower end with an integral bottom portion 21 having a centrally positioned, upwardly directed, and semi-spherical boss which constitutes a valve member 22 adapted to coact with the margins of the port or valve seat 19' to close the same. Around the valve member 22 the bottom portion is pierced by a plurality of discharge apertures 23.

The upper or open end of the sleeve 20 receives a ring or closure member 24 having a radially inturned portion 25 which, with the flange 17 of the shell 4, retains the shell and sleeve in coaxial and slidable relation. Between the inturned portion 25 and flange 17 is positioned spring means 26 which normally urges the valve 22 against its seat 19 to close the same. The spring 26 is so designed that should the pressure within the mixing shell 4 exceed a predetermined value the valve is such as to further insure against excessive pressure in the applicator line 3 even though the pressure of the hot and cold water supply and volume of water introduced into the mixing chamber should materially exceed the capacity of the applicator line.

The hot and cold water supply tubes 2 are enlarged or otherwise formed at their extended ends as indicated by 27, for facilitating connection to hot and cold water faucets 28, 28' as shown in Fig. 1.

Operation of our water valve is as follows:

The water valve is connected with the hot and cold water faucets as shown in Fig. 1; that is with the mixing chamber structure 1 hanging in a wash basin or similar receptacle, (not shown). The water from the two faucets are turned on, and, if desired, the applicator line may be held closed as by a suitable clamp device, not shown. The water from the two faucets exerts sufficient pressure under this condition to open the valve discharging the water into the basin. The discharging stream of water can then be tested for temperature and the relative quantities of hot and cold water varied accordingly. The applicator line may then be opened permitting flow from the applicator head of any suitable style, not shown.

In the event the water pressure in either the hot or cold water supply lines increases or in the event the faucets are opened to such a degree that pressure of the flow of water therefrom exceeds the predetermined flow value of the spring means 26, such pressure will act against the valves 22 so as to force the same away from its seat 19 and thereby permit water to flow from the mixing chamber A through the port 19' and discharge apertures 23, thereby maintaining a predetermined maximum pressure in the applicator or discharge tube 3.

When a person is through using the syringe the mixing chamber A may be fully and effectually drained by merely pressing downwardly on the sleeve 20 to open the valve 22 against tension of the spring 26 thereby permitting any liquid in the chamber A to flow therefrom through the port 19'; and if desired the plate 49 may be slightly inclined from the marginal portions 19x toward the port 19' so as to more effectually drain the water from the chamber A. This draining of the water from the mixing chamber A will prevent any liquid entrapped therein from spilling out of the inlet or outlet tubes when the device is detached from the faucets or liquid supply.

If a medicament is desired with the water this is inserted in the holder 13 before turning on the water supply. Should the plumbing be such that the hot and cold water faucets have a common outlet, one of the tubes 2 may be omitted and its connection with the mixing chamber structure 1 closed by inserting a plug analogous to the plug 10, without the holder connected thereto.

We claim:

1. In a water valve; a mixing chamber structure comprising a pair of telescoping shell members together defining a mixing chamber; a pressure relief valve means having coacting valve elements incorporated in said shell members; and yieldable means tending to relatively urge said shell members to close said valve means.

2. In a water valve; a shell member including a mixing chamber and a valve port; a sleeve covering a portion of the shell member; a closure for said port carried by said sleeve; and yieldable means interposed between said shell member and sleeve tending to urge said closure against said valve port; said closure being automatically opened by a predetermined pressure in said chamber.

3. In a water valve; a shell member including a manifold head and a valve port; a sleeve covering a portion of the shell member; a closure for said port carried by said sleeve; and yieldable means interposed between said shell member and sleeve tending to urge said closure against said valve port.

GEORGE W. TAYLOR.
ODA N. SEBASTIAN.